United States Patent Office 3,507,162
Patented Apr. 21, 1970

3,507,162
CYCLOPLANETARY GEARING HAVING A
VARYING OUTPUT SPEED RATIO
Takeo Nomura, Koganei, Tokyo, and Takeo Ishijima,
Funabashi, Japan, assignors to Nissei Kabushiki Kaisha,
Tokyo, Japan, a corporation of Japan
Filed Dec. 28, 1967, Ser. No. 694,278
Int. Cl. F16h 35/02
U.S. Cl. 74—394                                       3 Claims

ABSTRACT OF THE DISCLOSURE

Cycloplanetary gearing or a cycloid planetary gear assembly comprises an input shaft, one or more stationary sun wheels, and one or more planet wheels meshed with said stationary sun wheels so as to rotate without any slip. The cycloidal angular motion of a predetermined point on the periphery of the planet wheel with respect to the axis of the stationary sun wheel is used to drive an output shaft through the intermediary of a shaft coupled to the planet wheel and in turn driving a shaft via an arm, the latter shaft being fitted in a slot in a wheel connected to the output shaft.

---

This invention relates to cycloplanetary gearings or a cycloid planetary gear assembly, more particularly to a planetary gear assembly producing output power of which revolving speed varies in a cycloidal fashion.

Certain machines need to be driven at a low speed immediately after starting, at a high speed during intermediate motion, and again at a low speed prior to stoppage, so that mechanical shock at the start and stop may be eliminated and the accurate stopping position may be achieved. For instance, when an elevator is used to transfer automobiles between different floors of a multi-storied parking building, such elevator should stop accurately at the desired floor level for safety, while requiring high speed movement in the intermediate portions of the transferring operation for efficiency. At the same time, the elevator should be started and stopped slowly or gradually to eliminate undesired shocks to the automobiles being transferred. Known driving mechanism of such machines driven at varying speeds has been actuated by using complicated electrical control systems. However, with such known control systems, the variation of the speed has not been effected smoothly, but in steps. Mechanical shocks accompanying the stepwise speed variation frequently caused failure of the driving mechanism and damage of the commodities being handled thereby.

Therefore, an object of the present invention is to obviate the aforementioned difficulties of conventional driving mechanism of machines driven at a varying speed, by providing a special planetary gear assembly whose output revolving speed varies periodically in a cycloidal fashion. The planetary gear assembly is very simple in construction and can be manufactured at a low cost, yet it produces ideal speed variation for elimination of mechanical shocks following frequent starts and stops.

According to a salient feature of the present invention, one or more intermediate shafts can be driven by an input shaft, revolving at a uniform speed, through engagement between one or more sun wheels and one or more planet wheels so as to move around the input shaft at a speed varying in a cycloidal fashion. Accordingly, an output shaft is driven by the intermediate shafts so as to move at the cycloidally varying speed.

The planetary gear assembly according to the present invention can also be applied with advantage to other machines similar to the aforesaid elevator, such as charging conveyors, charging elevators, car feeders, various automobile feeding devices, cutting devices, stamping devices, labeller devices, marking devices, packing devices, traverser devices, shifter devices, turntable devices, and the like.

Other objects and a fuller understanding of the present invention may be had by referring to the following description, taken in conjunction with the accompanying drawings, in which.

Like parts are designated by like numerals and symbols throughout the drawings.

Figure 1:
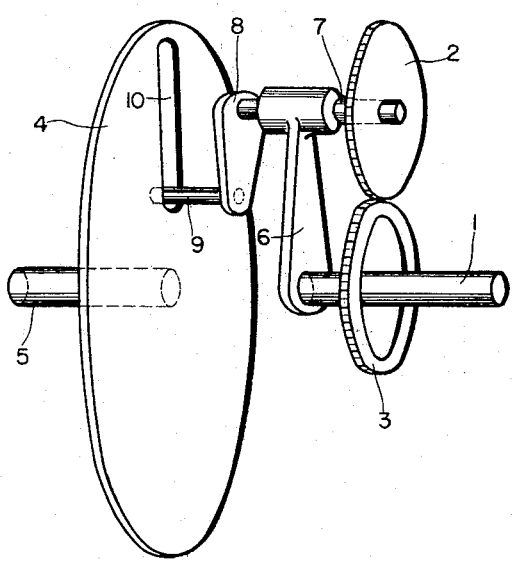
FIG. 1 is a schematic perspective view of a cycloid planetary gear assembly according to the present invention.

Now, referring to FIG. 1, depicting the operative principles of a cycloidal planetary gear assembly according to the present invention, 1 is a driving or input shaft, 2 a planet gear, 3 a stationary sun gear meshed with the planet gear, and 4 a driven wheel integrally formed with a driven or output shaft 5. A carrier arm 6 is integrally secured to the input shaft 1 and journals a carrier shaft 7 at the free end thereof. The planet gear 2 is carried by the carrier shaft 7 at one end thereof, while an intermediate arm 8 having an intermediate shaft 9 at one end thereof is secured to the opposite end of the carrier shaft 7. The intermediate shaft 9 is slidably fitted in a guide slit 10 formed on the driven wheel 4.

Figure 2:
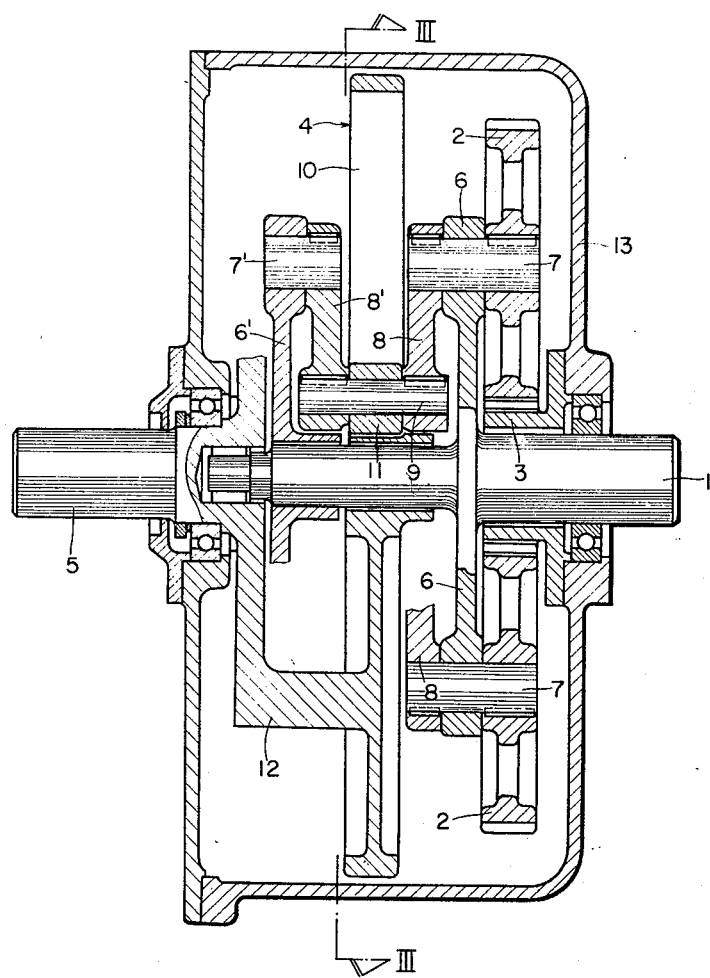
FIG. 2 is a longitudinal sectional view of the planetary gear assembly embodying the present invention.
Figure 3:
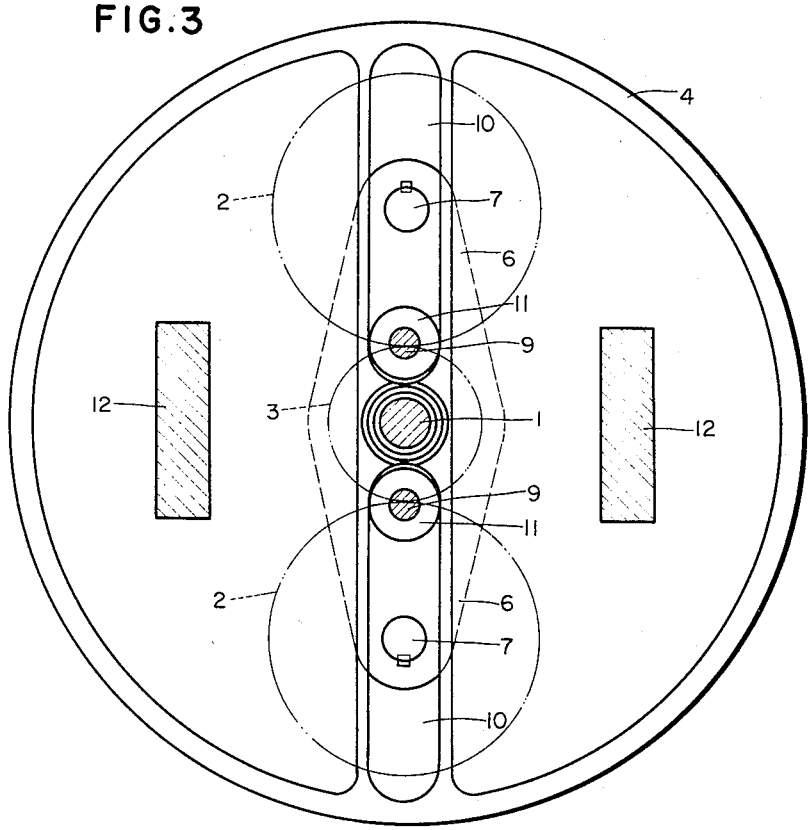
FIG. 3 is a transverse sectional view, taken on the line III—III of FIG. 2.

FIGS. 2 and 3 illustrate an embodiment of the present invention, in which provision is made to ensure sufficient mechanical strength of each element and smooth rotation of various rotatry members. In this particular embodiment, the driven wheel 4 is connected to output shaft 5 not directly but through a pair of arms 12 with a spacing therebetween. Input shaft 1 extends through the central portion of the driven wheel 4, and a pair of carrier arms 6 and 6' are integrally secured to the input shaft 1, one on each side of the driven wheel 4. The carrier arm 6 extends radially from the input shaft 1 in diametrically opposite directions, and carries a pair of carrier shafts 7 at opposite free ends thereof. Thereby, a pair of planet gears 2, each carried by the carrier shaft 7, are meshed with stationary sun gear 3, to be described hereinafter. A pair of intermediate arms 8 are secured to the opposite ends of the carrier shafts 7. A corresponding pair of intermediate arms 8' are rotatably secured through shafts 7' to the other carrier arm 6' at the opposite side of the driven wheel 4, in such a manner that the intermediate arms 8, 8 and 8', 8' are disposed symmetrically with respect to the driven wheel 4, as shown in the drawing. A pair of intermediate shafts 9 penetrate throuh each of a pair of slots 10 extending diametrically on the driven wheel 4, and each shaft 9 is carried by the pair of intermediate arms 8, 8' at both ends thereof in a crank-like fashion. In order to facilitate smooth sliding of the intermediate shaft 9 through the slot 10, a cylindrical roller 11 is provided on each shaft 9.

In the embodiment of FIGS. 2 and 3, the output shaft 5 is connected to the driven wheel 4 through the arms 12, but it is also possible to link them by means of other suitable gearing means (not shown), such as a ring gear in mesh teeth on the periphery of the driven wheel. With such gearing means between the output shaft 5 and the driven wheel 4, the output shaft 5 can be disposed at any desired angular relation with the input shaft 1, and it is also possible to modify the revolving speed of the output shaft 5 in proportion to the corresponding speed of the driven shaft 4.

For dealing with high power equipment, an additional pair of planet gears 2 can be mounted on the carrier shafts 7' held by the arms 6', so that the torque on both carrier shafts 7 and 7' is well balanced.

The tip of the input shaft 1 is supported by a bearing means provided at the inner end of the output shaft 5, so that the input and the output shafts can be rotated at different revolving speeds. The stationary gear 3 is integrally secured to housing 13 of the planetary gear assembly.

Figure 4:
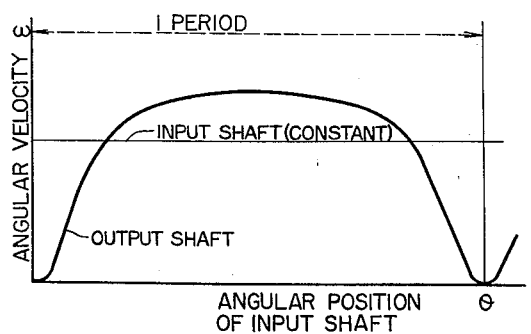
FIG. 4 is a graph illustrating the relationship between the angular position and the angular velocity of the input and output shafts of the cycloidal planetary gear assembly according to the present invention.

In operation of the planetary gear assembly of such construction, when the planet gear 2 rotates around the stationary sun gear 3 without any slip, a particular point on the periphery of the planet gear, which corresponds to the intermediate shaft 9, moves along a locus of a cycloidal curve. Thus, the revolving angular speed of the particular point or the intermediate shaft 9 around the center of the stationary sun gear varies in a cycloidal manner, from zero to the maximum and back to zero again, as depicted in FIG. 4. If a ratio of the radius of the planet gear to that of the stationary sun gear is represented by $\alpha$, an angular displacement of the center of the planet gear with respect to the center of the stationary sun gear from a certain reference point by $\theta$, and an angular velocity (constant) of the center of the planet gear with respect to the center of the stationary sun gear by $\omega_0$, then the angular velocity $\omega$ of the particular point on the periphery of the planet gear or that of the driven wheel 4 can be given by the following equation.

$$\omega = \omega_0 \frac{(\alpha+1)(2\alpha+1)\left(1-\cos\frac{\theta}{\alpha}\right)}{1+2\alpha(\alpha+1)\left(1-\cos\frac{\theta}{\alpha}\right)}$$

In other words, the driven wheel 4 rotates at a periodically and continuously varying angular speed, and FIG. 1 depicts the driven wheel 4 at a moment when its angular velocity is zero.

It should be noted here that the stationary sun gear 3 and the planet gears 2 in the aforesaid embodiment can be replaced with any suitable wheel means, which can rotate without causing any slip therebetween while satisfying the relationship of the preceding equation.

It is apparent from the above equation that the period of the speed variation of the driven shaft movement can be modified by selecting the ratio $\alpha$ of radii of the planet gear to that of the sun gear at a proper value. For instance, if the radius ratio $\alpha$ of the two gears is set at 1:1, the driven shaft revolves once and completes one period of speed variation for each rotation of the driving shaft 1. In the embodiment of FIGS. 2 and 3, the radius of the planet gear 2 is twice as large as the radius of the stationary sun gear 3, and hence, the period of the speed variation of the driven shaft corresponds to each two revolutions of the driving and driven shafts.

Furthermore, various modifications of the angular velocity characteristics of the cycloid planetary gear assembly according to the present invention can be achieved by simple change of the elements thereof. For example, the modification of the configuration of the guide slit from the illustrated linear form, e.g., nonradial to a suitable curved form will result in a considerable change in the angular velocity curve of FIG. 4. Referring to FIG. 2, if the radius of rotation of the intermediate shaft 9 around the carrier shaft 7, or the effective length of the intermediate arm 8, is modified with respect to the radius of the planet gear 2, the angular velocity characteristics of the driven wheel 4 and the output shaft 5 will be also changed. More particularly, if the radius of rotation of the intermediate shaft 9 around the carrier shaft 7 is made larger than the radius of the planet gear 2, then the output shaft 5 moves at the beginning and end of each period in the direction opposite to the direction of movement during the rest of the period, or negative low speed rotation of the output shaft 5 can be achieved. Furthermore, the danger of reverse power transmission from the driven shaft 5 to the driving shaft 1, at the beginning and the end of each motion cycle, can be eliminated almost completely in the planetary gear assembly according to the present invention.

What is claimed is:

1. A cycloidal planetary gear assembly comprising an input shaft revolving at a constant speed, a stationary sun wheel means arranged coaxially with said input shaft, a planet wheel means secured to said input shaft and in mesh with said stationary sun wheel means, an intermediate shaft secured to said planet wheel means offset from the axis of the planet wheel means, a driven wheel having an elongated slot arranged nonradially therein and slidably receiving the intermediate shaft to be driven thereby, and an output shaft adapted to be driven by said driven wheel, said driven wheel being replaceable, for modifying the speed-change characteristics in the output shaft, with another driven wheel having a differently shaped slot, whereby the uniform speed rotation of the input shaft is transmitted to said output shaft at a periodically changing speed, from a low speed through a high speed and back to the low speed.

2. A cycloidal planetary gear assembly according to claim 1, wherein the radius of rotation of the intermediate shaft is larger than the radius of the planet wheel so as to provide smooth and shockless reverse rotation in the output shaft in its low speed rotation range.

3. A cycloidal planetary gear assembly according to claim 1 wherein said slot is curved.

References Cited

UNITED STATES PATENTS

| 2,618,984 | 11/1952 | Oliver | 74—394 |
| 2,861,672 | 11/1958 | Buehrer et al. | |
| 3,127,777 | 4/1964 | Pietsch | 74—394 X |
| 3,173,525 | 3/1965 | Hergert | 74—394 X |
| 3,407,678 | 10/1968 | Steinke | 74—394 |

LEONARD H. GERIN, Primary Examiner

U.S. Cl. X.R.

74—84